US007254192B2

(12) United States Patent
Onggosanusi et al.

(10) Patent No.: US 7,254,192 B2
(45) Date of Patent: Aug. 7, 2007

(54) ITERATIVE DETECTION IN MIMO SYSTEMS

(75) Inventors: Eko N. Onggosanusi, Allen, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 735 days.

(21) Appl. No.: 10/618,970

(22) Filed: Jul. 14, 2003

(65) Prior Publication Data

US 2004/0083082 A1    Apr. 29, 2004

Related U.S. Application Data

(60) Provisional application No. 60/399,746, filed on Jul. 30, 2002, provisional application No. 60/395,604, filed on Jul. 12, 2002.

(51) Int. Cl.
    *H04L 27/06* (2006.01)
(52) U.S. Cl. ..................... 375/340; 375/347
(58) Field of Classification Search ............ 375/130, 375/140, 147, 149, 259, 260, 261, 262, 265, 375/316, 340, 341, 346, 347; 714/699, 746, 714/786, 792, 794, 795
    See application file for complete search history.

(56) References Cited

U.S. PATENT DOCUMENTS

| 5,446,747 A | * | 8/1995 | Berrou | 714/788 |
| 5,654,986 A | * | 8/1997 | Lim | 375/341 |
| 5,805,613 A | * | 9/1998 | Beery et al. | 714/752 |
| 6,912,684 B2 | * | 6/2005 | Miyata et al. | 714/776 |
| 2002/0167998 A1 | * | 11/2002 | Penther | 375/229 |
| 2004/0013212 A1 | * | 1/2004 | Benesty et al. | 375/347 |

* cited by examiner

*Primary Examiner*—Jay K. Patel
*Assistant Examiner*—Naheed Ejaz
(74) *Attorney, Agent, or Firm*—Ronald O. Neerings; Wade James Brady III; Frederick J. Telecky, Jr.

(57) ABSTRACT

Detection for a MIMO (multiple-input, multiple-output) wireless communications system with symbols iteratively detected in subsets with maximum likelihood hard decisions within subsets. Previously detected subsets of symbols are used to regenerate corresronding input signals for interference cancellation. With a 4-transmitter antenna, 4-receiver antenna system, two subsets of two symbols are possible with the first two symbols detected with zero-forcing or MMSE soft estimates which feed maximum likelihood hard decisions; and the hard decision for the first two symbols are used for interference cancellation followed by zero-forcing or MMSE soft estimates for the second two symbols which then feed further maximum likelihood hard decisions.

11 Claims, 6 Drawing Sheets

ITERATIVE DETECTION IN MIMO SYSTEMS

CROSS-REFERENCE TO RELATED APPLICATIONS

Priority is claimed from provisional applications: Appl.Nos. 60/395,604, filed Jul. 12, 2002, and 60/399,746, filed Jul. 30, 2002. The following copending application dislcoses related subject matter and has a common assignee: application Ser. No. 10/447,978, filed May 29, 2003.

BACKGROUND OF THE INVENTION

The present invention relates to communication systems, and more particularly to multiple-input multiple-output wireless systems.

Wireless communication systems typically use band-limited channels with time-varying (unknown) distortion and may have multi-users (such as multiple cellphone users within a cell). This leads to intersymbol interference and multi-user interference, and requires interference-resistant detection for systems which are interference limited. Interference-limited systems include multi-antenna systems with multi-stream or space-time coding which have spatial interference, multi-tone systems, TDMA systems having frequency selective channels with long impulse responses leading to intersymbol interference, CDMA systems with multi-user interference arising from loss of orthogonality of spreading codes, high data rate CDMA which in addition to multi-user interference also has intersymbol interference.

Interference-resistant detectors commonly invoke one of three types of equalization to combat the interference: maximum likelihood sequence estimation, (adaptive) linear filtering, and decision-feedback equalization. However, maximum likelihood sequence estimation has problems including impractically large computation complexity for systems with multiple transmit antennas and multiple receive antennas. Linear filtering equalization, such as linear zero-forcing and linear minimum square error equalization, has low computational complexity but has relatively poor performance due to excessive noise enhancement. And decision-feedback (iterative) detectors, such as iterative zero-forcing and iterative minimum mean square error, have moderate computational complexity but only moderate performance.

Thus there is a problem of trade-off of performance and computational complexity for multiple-input, multiple-output systems.

SUMMARY OF THE INVENTION

The present invention provides a method and detector for multiple-input, multiple-output (MIMO) systems which iteratively detects subsets of symbols and thereby allows reduced-state maximum likelihood decisions.

This has advantages including improved performance with moderate increase in computational complexity.

DETAILED DESCRIPTION OF THE PREFERRED EMBODIMENTS

1. Overview

Figure 1A:
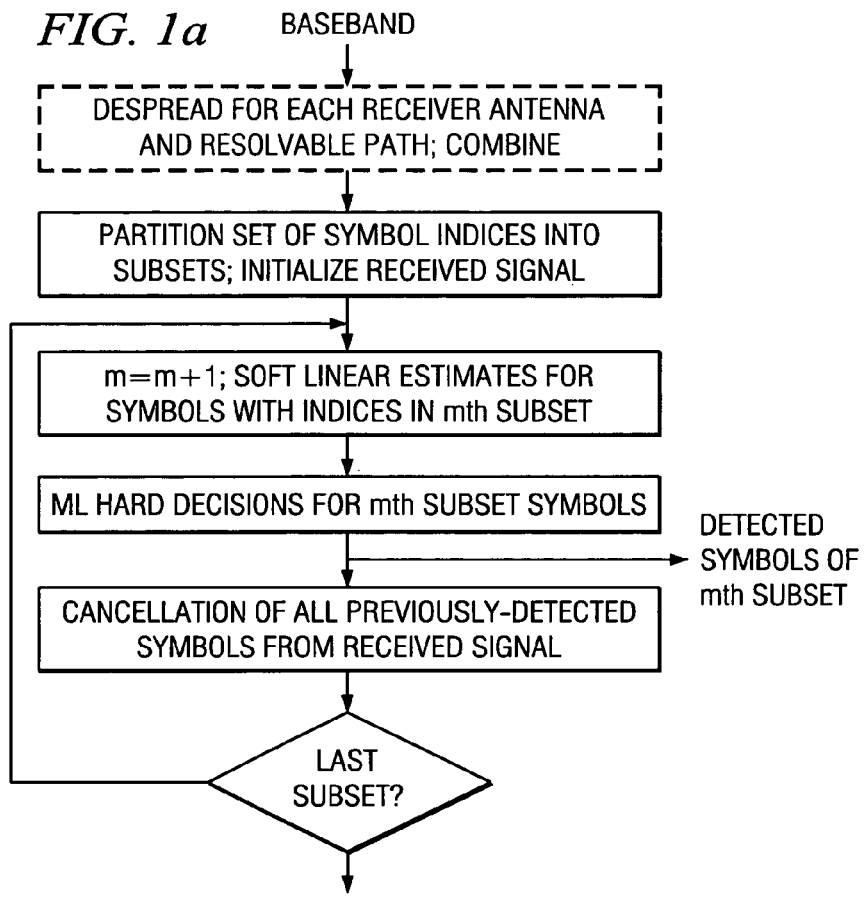
FIGS. 1a-1b are flow and functional block diagrams.
Figure 1B:
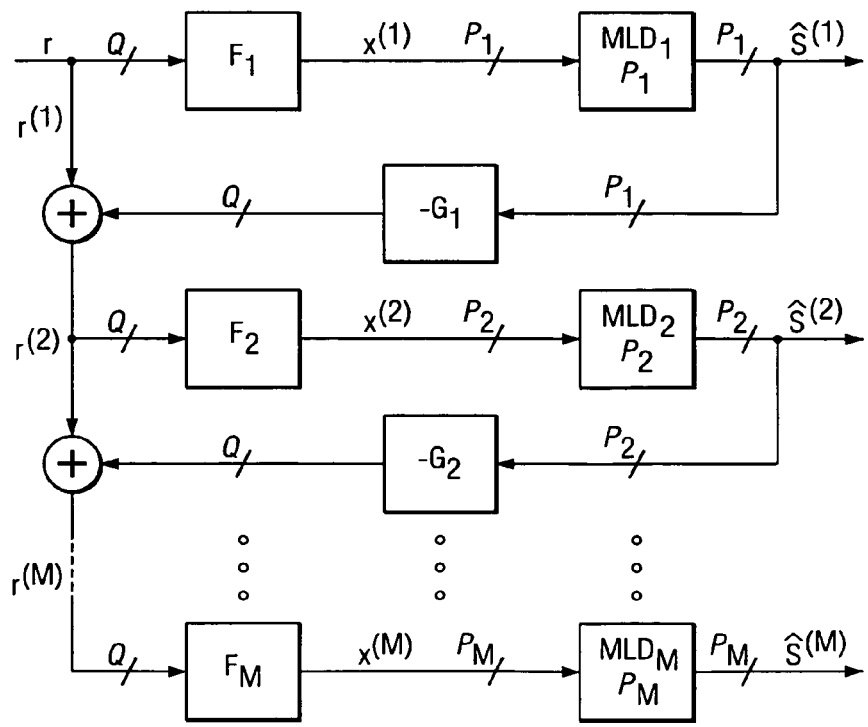

Preferred embodiment detectors and detection methods for multi-input, multi-output (MIMO) systems partition the set of transmitted symbols into subsets and jointly detect the symbols within a subset and iteratively detect the subsets. This provides interference cancellation of previously detected symbols. The joint detection within a subset may be a linear soft detection followed by maximum likelihood (ML) hard decision. FIG. 1a is a flow diagram, and FIG. 1b illustrates functional blocks of a preferred embodiment which partitions of a set of P symbol indices, $\{1, 2, \ldots, P\}$, into M subsets, $I_1, I_2, \ldots, I_M$, of sizes $P_1, P_2, \ldots, P_m$, respectively. Thus, $P = \Sigma_{1 \leq m \leq M} P_m$. The hard estimates for the $P_m$ symbols with indices in subset $I_m$ are computed by a $P_m$-input, $P_m$-output ML detector. These hard estimates are then used to regenerate the signal components associated with the symbols whose indices lie in $I_m$, and the regenerated components from this iteration plus prior iterations are subtracted from the received signal (interference cancellation) for use as input to the next iteration. This use of ML detection in reduced states (subsets of indices) provides a range of performance-complexity trade-offs previously unavailable.

Figure 2A:
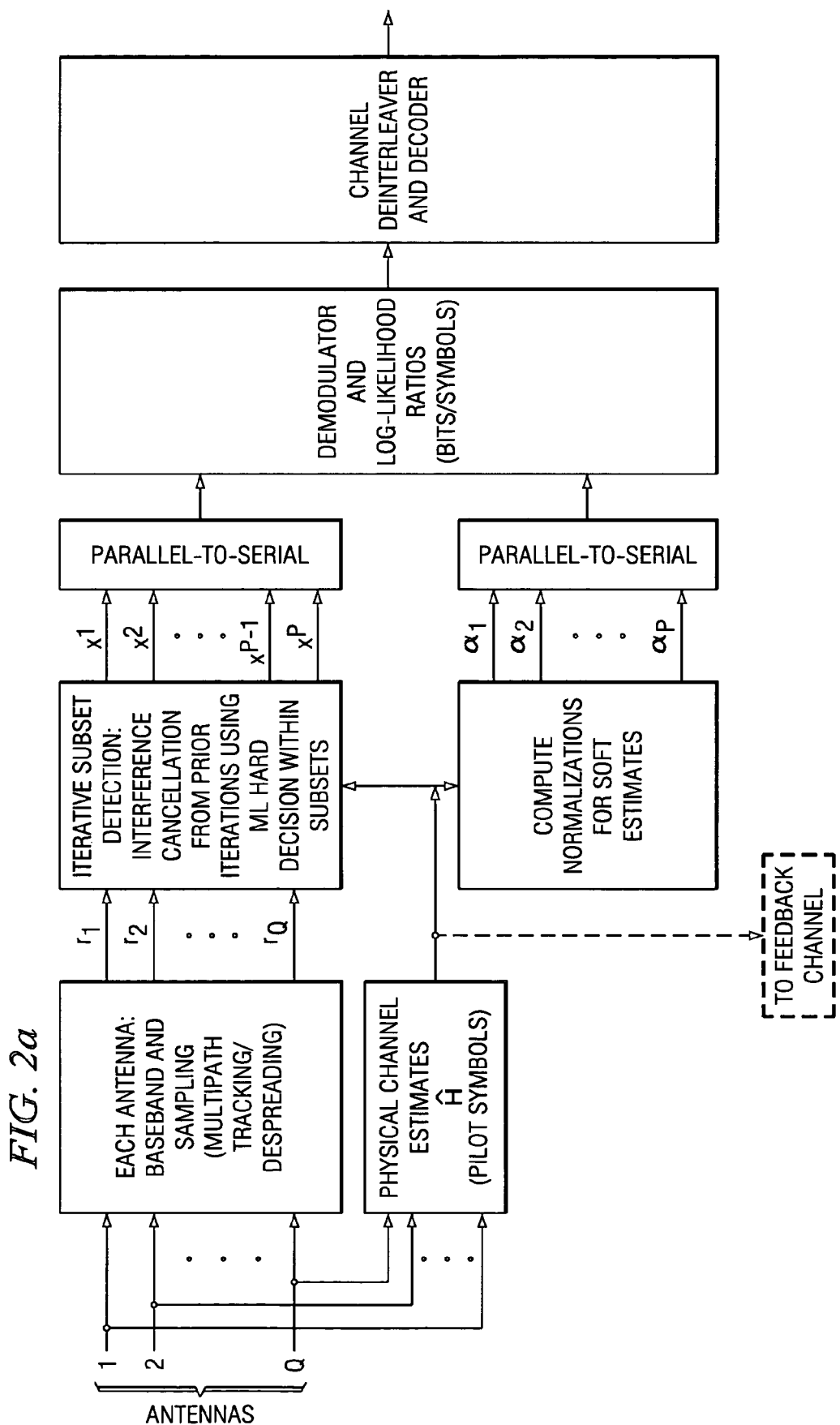
FIGS. 2a-2c illustrate receivers and transmitters.
Figure 2B:
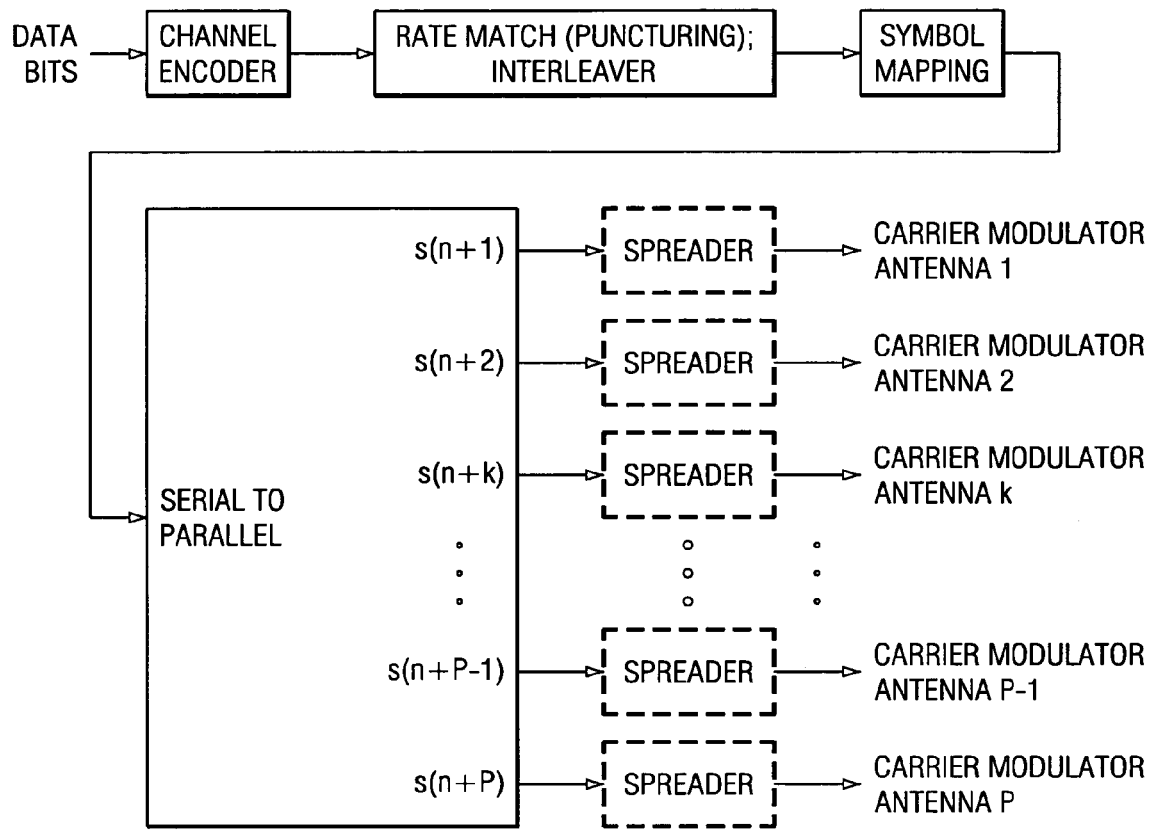
Figure 2C:
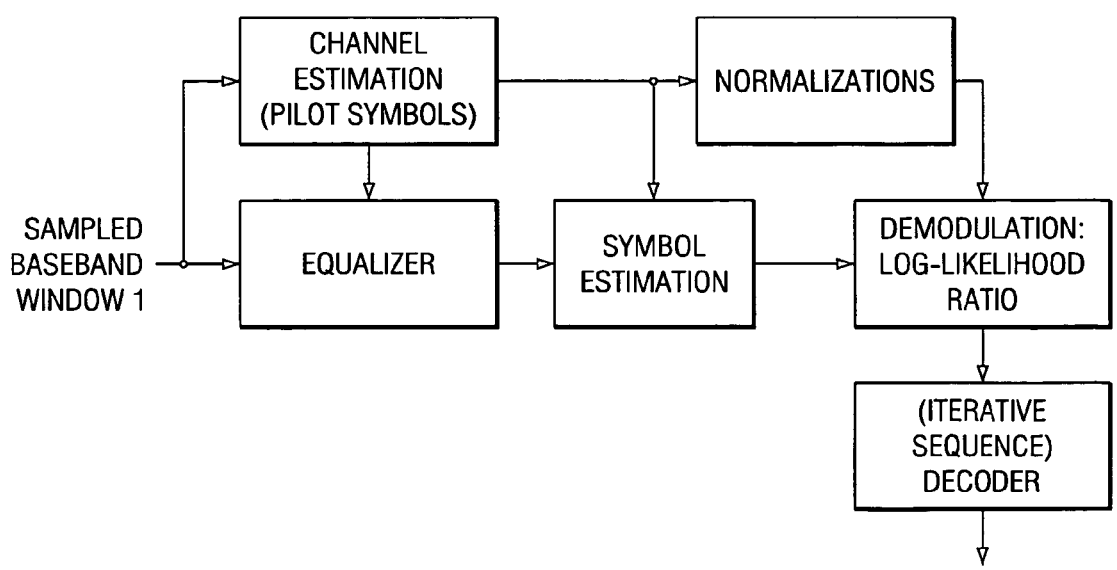

Preferred embodiment wireless communication systems incorporate preferred embodiment detection methods. FIG. 1b illustrates functional blocks of a preferred embodiment detector. FIG. 2a shows a corresponding receiver for a MIMO wireless communications system; and FIG. 2b shows a P-antenna transmitter for such a system. In such systems components, base stations, and mobile users, could each include one or more application specific integrated circuits (ASICs), (programmable) digital signal processors (DSPs), and/or other programmable devices with stored programs for implementation of the preferred embodiment. The base stations and mobile users may also contain analog integrated circuits for amplification of inputs to or outputs from antennas and conversion between analog and digital; and these analog and processor circuits may be integrated on a single die. The stored programs may, for example, be in external or onboard ROM, flash EEPROM, and/or FeRAM. The antennas may be parts of RAKE detectors with multiple fingers for each user's signals. The DSP core could be a TMS320C6xxx or TMS320C5xxx from Texas Instruments.

2. Iterative Detectors

First consider iterative detectors generally. FIG. 2a illustrates a receiver with an interference-resistant detector as could be used in a wireless communications system with P transmit antennas (P data streams) and Q receive antennas. FIG. 2b illustrates a corresponding transmitter with P transmit antennas. The received signal in such a system can be written as:

$$r = Hs + w$$

where r is the Q-vector of samples of the received baseband signal (complex numbers) corresponding to a transmission time n:

$$r = \begin{bmatrix} r_1(n) \\ r_2(n) \\ \vdots \\ r_Q(n) \end{bmatrix};$$

s is the P-vector of transmitted symbols (complex numbers of a symbol constellation) for time n:

$$s = \begin{bmatrix} s_1(n) \\ s_2(n) \\ \vdots \\ s_P(n) \end{bmatrix};$$

H is the Q×P channel matrix of attenuations and phase shifts; and w is a Q-vector of samples of received (white) noise. That is, the (q,p)th element of H is the channel (including multipath combining and equalization) from the pth transmit source to the qth receive sink, and the qth element of w is the noise seen at the qth receive sink.

Note that the foregoing relation applies generally to various systems with various interference problems and in which n, r, s, P, and Q have corresponding interpretations. For example:

(a) High data rate multi-antenna systems such as BLAST (Bell Labs layered space time) or MIMO and multi-stream space-time coding: spatial interference suppression techniques are used in detection.

(b) Broadband wireless systems employing OFDM (orthogonal frequency division multiplex) signaling and MIMO techniques for each tone or across tones.

(c) TDMA (time division multiple access) systems having frequency-selective channels with long impulse response which causes severe ISI (intersymbol interference). Use equalizers to mitigate ISI.

(d) CDMA (code division multiple access) systems having frequency-selective channels which cause MUI (multi-user interference) as a result of the loss of orthogonality between spreading codes. For high data rate CDMA systems such as HSDPA and 1xEV-DV, this problem is more severe due to the presence of ISI. Equalizers and/or interference cancellation may be used to mitigate these impairments.

(e) Combinations of foregoing.

Hence, P is essentially the number of symbols that are jointly detected as they interfere with one another, and Q is simply the number of collected samples at the receiver. Because there are P independent sources, Q must be at least as large as P to separate the P symbols. A (interference-resistant) detector in a receiver as in FIGS. 2a-2b analyzes received signal vector r and outputs soft estimates x of the transmitted symbols s to a demodulator and decoder.

Presume that the different symbols which are transmitted via P different antennas are uncorrelated and also may utilize different modulation schemes. This implies the P×P matrix of expected symbol correlations, $\Lambda = E[ss^H]$, is diagonal with entries equal the expected symbol energies ($\lambda_k = E[|S_k|^2]$):

$$\Lambda = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_P \end{bmatrix}$$

For linear filtering equalization detectors, such as linear zero-forcing (LZF) or linear minimum mean square error (LMMSE), the soft estimates, denoted by P-vector x, derive from the received signal by linear filtering with P×Q matrix F; namely, x=Fr.

In particular, LMMSE detection finds the matrix F by minimizing the mean square error, $E[\|x-s\|^2]$. With perfect estimation of the channel H, the minimizing matrix F is given by:

$$F_{LMMSE} = [H^H H + \sigma^2 \Lambda^{-1}]^{-1} H^H$$
$$= \Lambda H^H [H \Lambda H^H + \sigma^2 I_Q]^{-1}$$

where $\sigma^2$ is the variance per symbol of the additive white noise w and $I_Q$ is the Q×Q identity matrix. Note F has the form of a product of an equalization matrix with $H^H$ which is the matrix of the matched filter for the channel.

Analogously, LZF detection finds the matrix F by inversion:

$$F_{LZF} = [H^H H]^{-1} H^H$$

Essentially, LZF detection nulls out the interference at the expense of excessive noise enhancement, while LMMSE detection minimizes the sum of interference and noise energy to provide a balanced trade-off between bias (due to residual interference) and variance (due to noise enhancement). But then each component of x is processed separately to obtain a corresponding hard symbol estimate. That is, a hard estimate, $\hat{s}_i$, for the ith symbol, $s_i$, comes from application of a hard decision operator to the soft estimate: $\hat{s}_i = \mathcal{D}\{x_i\}$ for i=1, 2, ..., P, where $\mathcal{D}\{\}$ is a non-linear decision device, usually a single-input, single-output (SISO) maximum-likelihood (ML) detector.

A typical iterative (decision-feedback) detector (IZF or IMMSE) for blocks of P symbols has a series of P linear detectors (P iterations) with each linear detector followed by a (hard) decision device and interference subtraction (cancellation). Each of the P linear detectors (iterations) generates both a hard and a soft estimate for one of the P symbols. The hard estimate is used to regenerate the interference arising from the already-estimated symbols which is then subtracted from the received signal, and the difference used for the next linear symbol estimation. Hence, the hard symbol estimates, $\hat{s}_i$, are also computed in a disjoint fashion.

On the other hand, the optimal joint maximum likelihood (ML) detector generates the hard symbol estimates as:

$$\hat{s}_{ML} = \arg\min_{s \in C} \|r - Hs\|^2$$

where $C = C_1 \times C_2 \times \ldots \times C_P$ is the P-dimensional constellation of P-vectors of symbols and has size $\Pi_{1 \leq j \leq P} |C_j|$ where $|C_j|$ denotes the number of elements in constellation $C_j$. Thus the hard symbol estimates are jointly computed, and the computational complexity of this optimal detection is proportional to the constellation size which is exponential in P.

When an error correcting code is employed, soft symbol or soft bit (log likelihood ratio) estimates are often desired (see Section 8 for example). While soft symbol estimates can be obtained in many ways, the conditional expectation estimator is optimal. The conditional expectation estimator is:

$$\hat{s} = E[s \mid r] = \frac{\sum_{s \in C} s \times \exp(-\|r - Hs\|^2 / \sigma^2)}{\sum_{s \in C} \exp(-\|r - Hs\|^2 / \sigma^2)}$$

The performance loss of iterative detectors comes from the disjoint processing of the soft symbol estimates, $x_i$, to obtain the corresponding hard symbol estimates, $\hat{s}_i$. The preferred embodiment detectors circumvent this problem by partial ML detections with moderate computational complexity.

3. Iterative Reduced-state Maximum-likelihood Detection

FIG. 1a is a flow diagram and FIG. 1b shows functional blocks for first preferred embodiment detection methods which detect a P-vector of transmitted symbols, s, from a received Q-vector signal, r, as expressed in the following pseudocode which presumes a partition of the set of symbol indices, $\{1, 2, \ldots, P\}$, into M subsets of indices $I_1, I_2, \ldots, I_M$, where $I_m$ has $P_m$ elements.

```
initialize r^(1) = r
for m = 1 to M
    x^(m) = F_m r^(m)   // P_m-vector of soft estimates for I_m indexed symbols
    ŝ^(m) = MLD_m{x^(m)}  // P_m-vector of hard decisions for I_m indexed symbols
    r^(m+1) = r^(m) - G_m ŝ^(m)   // interference cancellation using hard estimates
end
``` where $F_m$ is a $P_m \times Q$ matrix for the feedforward transformation of received signal into soft estimates, $x^{(m)}$, of the $I_m$ indexed symbols; $MLD_m$ is a $(P_m, P_m)$ maximum likelihood (ML) detector; $G_m$ is a $Q \times P_m$ matrix for the feedback transformation using the mth iteration output for interference cancellation. The following paragraphs describe choices for $F_m$, $G_m$, and $MLD_m$. And note that the preferred embodiment methods for trivial index set partitions reduce to the usual methods: for M=1 (no partitioning), the method is just an ML detection for all of the symbols, and for M=P (every index is a separate subset), the method is just regular iterative detection.

Zero-forcing and minimum mean square error criteria each define $F_m$ and $G_m$ as follows. Begin with some convenient notation: let $J_1 = \{1, 2, \ldots, P\}$ and recursively take $J_m = J_{m-1} - I_{m-1}$ for $2 \le m \le M$, so $J_m$ is the set of indices of symbols remaining to be detected at the start of the mth iteration. Let $H_m$ be the $Q \times P_m$ matrix consisting of columns of H with index in $I_m$, so $H_m$ is the channel matrix for the $P_m$ symbols being detected during the mth iteration. Let $K_m$ be the $Q \times (\Sigma_{m \le k \le M} P_k)$ matrix consisting of the columns of H with index in $J_m$, so $K_m$ is the channel matrix for the symbols remaining to be detected at the start of the mth iteration ($K_1 = H$). Let $\Lambda_m$ be the $P_m \times P_m$ diagonal sub-matrix of $\Lambda$ of elements with both row and column indices in $I_m$; consequently, the elements of $\Lambda_m$ are the energies of the symbols to be detected during the mth iteration. Let $\Pi_m$ be the $(\Sigma_{m \le k \le M} P_k) \times (\Sigma_{m \le k \le M} P_k)$ diagonal sub-matrix of $\Lambda$ of elements with both row and column indices in $J_m$, so the elements of $\Pi_m$ are the energies of the symbols remaining to be detected at the start of the mth iteration. Let $1_m$ be the $P_m \times Q$ the matrix of the rows of the identity matrix $I_Q$ with row index in $I_m$; that is, $1_{m(p,q)} = 1$ if q is the pth element of $I_m$ and $=0$ otherwise, and thus $1_m$ extracts the subspace spanned by the symbols to be detected in the mth iteration.

Neglecting decision feedback error and choosing $F_m$ and $G_m$ according to the zero-forcing criterion yields for m=1, 2, ..., M-1:

$$F_m = 1_m [K_m^H K_m]^{-1} K_m^H$$

$$G_m = H_m$$

Analogously, choosing $F_m$ and $G_m$ according to the minimum mean square error criterion yields for m=1, 2, ..., M-1:

$$F_m = 1_m [K_m^H K_m + \sigma^2 \Pi_m^{-1}]^{-1} K_m^H$$
$$= \Lambda_m H_m^H [K_m \Pi_m K_m^H + \sigma^2 I_Q]^{-1}$$

$$G_m = H_m$$

In both cases during the last iteration (m=M) all remaining symbols will be detected, so $J_M = I_M$, $K_M = H_M$, $\Pi_M = \Lambda_M$. Further, there is no next iteration and thus no need for a cancellation matrix $G_M$; see FIG. 1b. The following sections 4 and 5 provide an explicit example and an extension to compensate for decision feedback error.

The maximum likelihood hard decision for the mth iteration, $MLD_m$, depends upon the signal model for $r^{(m)}$. In particular, $$r^{(m)} = r^{(m-1)} - G_{m-1} \hat{s}^{(m-1)}$$
$$= r - \sum_{1 \le k \le m-1} G_k \hat{s}^{(k)}$$
$$= Hs + w - \sum_{1 \le k \le m-1} G_k \hat{s}^{(k)}$$

where $\hat{s}^{(k)}$ is the $P_k$-vector of hard estimates of $s^{(k)}$ which is the $P_k$-vector of symbols with indices in subset $I_k$.

Now for the case of no feedback error, $G_k = H_k$ and $\hat{s}^{(k)} = s^{(k)}$, so the model becomes $$r^{(m)} = \Sigma_{m \le j \le M} H_j s^{(j)} + w$$

Thus the soft estimates can be written as:

$$x^{(m)} = F_m r^{(m)}$$

-continued $$= F_m H_m s^{(m)} + \sum_{m+1 \leq j \leq M} F_m H_j s^{(j)} + F_m w$$

$$= F_m H_m s^{(m)} + i_m$$

where $i_m$ is the residual interference-plus-noise term corresponding to the mth iteration detection. Note that the desired signal term, $F_m H_m s^{(m)}$, is uncorrelated to the residual interference-plus-noise and that $$E[i_m i_m^H] = F_m K_{m+1} \Pi_m (F_m K_{m+1})^H + \sigma^2 F_m F_m^H$$

For notational convenience define $\psi_m = E[i_m i_m^H]$ which is a $P_m \times P_m$ matrix. Then assuming the residual interference is approximately Gaussian with covariance matrix $\psi_m$, so log-likelihood metric for $MLD_m$ is just the Euclidean metric scaled by the covariance matrix:

$$\hat{s}^{(m)} = \arg \min_{c^{(m)}} \| \Psi_m^{-1/2} (x^{(m)} - F_m H_m c^{(m)}) \|^2$$

where $c^{(m)}$ is a $P_m$-vector of symbols in the product of the $P_m$ constellations of symbols with indices in $I_m$. Thus the hard decision is found by computing all of the metrics and taking the symbol vector which generates the minimum metric; and if all of the constellations have the same size $|C|$ (such as all are $|C|$-QAM), then the number of metrics to compute is $|C|^{P_m}$.

Note that for $F_m$ and $G_m$ defined using the zero-forcing criterion there is no residual interference because $F_m K_{m+1} = 0$. In this case $i_m$ is exactly Gaussian. For the MMSE criterion, however, some residual interference exists; hence, $i_m$ is a mixture of Gaussian (from the noise) and non-Gaussian (residual interference) random processes. For sufficiently dense symbol constellations and/or a sufficiently large number of antennas, the interference can be well approximated as Gaussian. Otherwise, a variation of the MLD decision for MMSE-based detection is the use of the exact probability density function (pdf) of $i_m$ in the maximum likelihood detection. Because $i_m$ is the sum of $F_m w$ and $\Sigma_{m+1 \leq j \leq M} F_m H_j s^{(j)}$, its pdf is the convolution of their pdfs.

4. 4×4 Example

As an example consider the 4×4 MIMO system with the preferred embodiment partitioning the symbols into two subsets of two symbols each; that is, P=Q=4 with $P_1=P_2=2$ (M=2). Explicitly, take $I_1=\{1,2\}$ and $I_2=\{3,4\}$; then with $h_k$ denoting the kth column of 4×4 channel matrix H, the zero-forcing criterion yields:

$F_1 = 1_{\{1,2\}} [H^H H]^{-1} H^H$  (2×4 matrix)

$G_1 = [h_1 h_2]$  (4×2 matrix)

$F_2 = [h_3 h_4]^H$  (2×4 matrix)

Analogously, the MMSE criterion gives:

$$F_1 = 1_{\{1,2\}} [H^H H + \sigma^2 \Lambda^{-1}]^{-1} H^H \quad (2 \times 4 \text{ matrix})$$

$$= \begin{bmatrix} \lambda_1 h_1^H \\ \lambda_2 h_2^H \end{bmatrix} [\lambda_1 h_1 h_1^H + \lambda_2 h_2 h_2^H + \sigma^2 I_4]^{-1}$$

$G_1 = [h_1 h_2]$  (4×2 matrix)

$F_2 = [h_3 h_4]^H$  (2×4 matrix)

The simulations of section 9 compare performance of various modifications of this 4×4 MIMO system preferred embodiment plus regular iterative detection.

5. Feedback Error Compensation

In general, the error-free decision feedback assumption is sufficiently accurate for high signal-to-noise ratio (SNR) and good channel conditions. Otherwise, error propagation may occur. When the MMSE criterion is used, the effect of error propagation can be taken into account by using the second order model which presumes the correlation of the transmitted symbols and their hard estimates is expressed by a diagonal P×P energy-correlation matrix:

$$E[s \hat{s}^H] = \begin{bmatrix} \lambda_1 \rho_1 & 0 & \cdots & 0 \\ 0 & \lambda_2 \rho_2 & \cdots & 0 \\ \vdots & \vdots & \ddots & \vdots \\ 0 & 0 & \cdots & \lambda_P \rho_P \end{bmatrix}$$

where the symbol-hard estimate correlations $\rho_j$ are generally real-valued and in the range $-1 \leq \rho_j \leq +1$. Let R denote the P×P diagonal matrix of these correlations. Then define the $P_m \times P_m$ diagonal correlation submatrix $R_m$ with diagonal elements $\rho_k$ for k in $I_m$ and the $(\Sigma_{m \leq k \leq M} P_k) \times (\Sigma_{m \leq k \leq M} P_k)$ diagonal correlation submatrix $\mathcal{R}_m$ with diagonal elements $\rho_k$ for k in $J_m$. Thus, $R_m$ is useful for interference cancellation at the end of the mth iteration when the $\hat{s}^{(m)}$ are available, so the $\rho_k$ for k in $I_m$ are generally non-zero in $R_m$. Further, $\mathcal{R}_m$ is useful for interference suppression at the start of the mth iteration when the $\hat{s}^{(m)}$ are not yet available and so the $\rho_k$ for k in $I_m$ are set to zero in forming $\mathcal{R}_m$. All the $\rho_k$ for k in $J_m$ are not yet available so this is all 0s. For multistage detection, some $\rho_k$ will be 0 for the undetected symbols in the first stage; during the second stage estimates from the previous stage for all the symbols are available and $\rho_k$ is non-zero for every k.

Taking into account the effect of error propagation in the MMSE criterion approach leads to modified $F_m$ and $G_m$; for m=1, 2, . . . M−1:

$$F_m = 1_m [K_m^H K_m (I - \mathcal{R}_m^2) + \sigma^2 \mathcal{R}_m^{-1}]^{-1} K_m^H$$

$$= \Lambda_m H_m^H [K_m (I - \mathcal{R}_m^2) \mathcal{R}_m K_m^H + \sigma^2 I_Q]^{-1}$$

$$G_m = H_m R_m$$

Note that these modified matrices reduce to the prior expressions when $\rho_k = 1$ for previously-detected symbols. In particular, $\rho_k = 1$ for k in $J_m - I_m$ reduces $F_m$ to the prior expression and $\rho_k = 1$ for k in $I_m$ reduces $G_m$ to the prior expression.

This feedback error compensation by use of correlations to limit cancellation allows for a multistage detection with each stage a set of M iterations as in the foregoing and with the hard estimates and correlations of one stage used as initial conditions for the next stage. In this manner, performance can be improved in stages by controlling the cancellation according to current correlation. Of course, the correlations must be computed, either by ensemble averaging (i.e., use a pilot channel or a set of training symbols that undergo the same MIMO channel as the information symbols) or by use of an analytical model (e.g., specific symbol constellation and Gaussian approximations) which can relate correlations and SINRs (which are used to define the F and G matrices) plus provide convergence to limiting values through successive stages.

In particular, if superscript/subscript [n] denotes nth stage variables, then the first stage would be as described in the preceding paragraphs: the mth iteration would include:

$$r^{[1](m)} = r^{[1](m-1)} - G_{[1]m-1}\hat{s}^{[1](m-1)}$$
$$= r - \sum_{1 \leq k \leq m-1} G_{[1]k}\hat{s}^{[1](k)}$$

$$F_{[1]m} = \Lambda_m H_m^H [K_m(K_m(I - \mathbf{Я}_{[1]m}^2)\mathbf{Л}_m K_m^H + \sigma^2 I_Q]^{-1}$$

$$x^{[1](m)} = F_{[1]m} r^{[1](m)} \ldots$$

$$\hat{s}^{[1](m)} = \text{MLD}_m\{x^{[1](m)}\}$$

$$G_{[1]m} = H_m R_{[1]m}$$

Then the second stage would have first stage hard estimates of interfering subsets of symbols to include in the cancellations, so $$r^{[2](m)} = r^{[2](m-1)} - G_{[2]m-1}\hat{s}^{[2](m-1)}$$
$$= r - \sum_{1 \leq k \leq m-1} G_{[2]k}\hat{s}^{[2](k)} - \sum_{m+1 \leq j \leq M} G_{[1]j}\hat{s}^{[1](j)}$$

Note that the hard estimates from the first stage for the subset of symbols being detected, $\hat{s}^{[1](m)}$, are not part of the cancellation. And the correlation matrices $\mathbf{Я}_{[2]m}$ can use first stage correlations $\rho_{[1]k}$ for k in $J_m$, whereas $R_{[2]m}$ is used after the mth iteration and will have correlations $\rho_{[2]k}$ for k in $J_m$. And so forth for subsequent stages.

6. Ordered Detection

Ordered detection based on the symbol post-detection signal-to-interference-plus-noise ratio (SINR) is often used to further improve performance. error. Selecting the detection ordering in the foregoing preferred embodiments amounts to selecting the index sets $I_1, I_2, \ldots, I_M$ that form a partition of $\{1, 2, \ldots, P\}$. One may select a pre-determined detection ordering that does not depend on the channel realization H. Analogous to the conventional iterative detection, further improvement can be obtained by selecting the ordering as a function of H based on a selected performance measure as in the following examples.

(1) Pre-ML SINR Measures

At the start of the mth iteration, compare the ($\Sigma_{m \leq k \leq M} P_k$) SINR values associated with the index set $J_m$, and select index set $I_m$ to label the $P_m$ largest SINR values. Note that closed form expressions for the SINR as a function of the channel realization can be obtained for different detection criteria. In particular, define the SINR associated with symbol $s_p$ at the mth iteration as $\gamma_p^{(m)}$. For the zero-forcing criterion this yields for $p \in I_m$:

$$\gamma_p^{(m)} = \lambda_p/\sigma^2[(K_m^H K_m)^{-1}]_{p,p}$$

Whereas the MMSE criterion together with the feedback error compensation yields for $p \in I_m$:

$$\gamma_p^{(m)} = \lambda_p h_p^H \left[\sum_{n \in J_{m+1}} \lambda_n(1-\rho_n^2)h_n h_n^H + \sum_{k \in I_m - p} \lambda_k h_k h_k^H + \sigma^2 I_Q\right]^{-1} h_p$$
$$= \lambda_p/[\sigma^2 \mathbf{Я}_m^{-1}(K_m^H K_m)(I - \mathbf{Я}_m^2) + \sigma^2 \mathbf{Я}_m^{-1})^{-1}]_{p,p} - 1$$

where $h_k$ is the kth column of H, and the case of error-free feedback is a special case.

(2) Post-ML SINR measures

Intuitively, better detection ordering can be obtained when a measure of SINR after the ML detection. Several possible post-ML detection measures can be derived from the symbol error rate (SER) expression of ML detection. Starting from the ML metric above, scale by $\Psi_m^{-1/2}$ to define:

$$y^{(m)} \stackrel{def}{=} \Psi_m^{-1/2} x^{(m)}$$
$$\Theta_m \stackrel{def}{=} \Psi_m^{-1/2} F_m K_m$$
$$j_m \stackrel{def}{=} \Psi_m^{-1/2} i_m$$

Then $$y^{(m)} = \Psi_m^{-1/2} x^{(m)}$$
$$= \Psi_m^{-1/2}(F_m K_m s^{(m)} + i_m)$$
$$= \Psi_m^{-1/2} \Theta_m s^{(m)} + j_m$$

Here the scaled residual interference-plus-noise term, $j_m$, is white with $E[j_m j_m^H] = I$. Let $\mathcal{S}_m$ denote the $P_m$-dimensional product of constellations of the symbols with indices in $I_m$; that is, $\mathcal{S}_m = \Pi_{k \in I_m} C_k$ where $C_k$ is the symbol constellation for $s_k$ and the product is over k in $I_m$. Also let $N_m$ denote the size of $\mathcal{S}_m$, so $N_m = \Pi_{k \in I_m} |C_k|$. An upper bound of symbol error rate (SER) corresponding to $\text{MLD}_m$ can be derived as follows:

$$SER_m = Pr(\hat{s}^{(m)} \neq s^{(m)})$$
$$= (1/N_m) \sum_{\alpha \in \mathcal{S}_m} Pr(\hat{s}^{(m)} \neq s^{(m)} | s^{(m)} = \alpha)$$
$$= (1/N_m) \sum_{\alpha \in \mathcal{S}_m} \sum_{\hat{\alpha}, \hat{\alpha} \neq \alpha} Pr(\hat{s}^{(m)} = \hat{\alpha} | s^{(m)} = \alpha)$$
$$= (1/N_m) \sum_{\alpha \in \mathcal{S}_m} \sum_{\hat{\alpha}, \hat{\alpha} \neq \alpha} Pr\left(\bigcap_{\beta \neq \hat{\alpha}} \{||y^{(m)} - \Theta_m \hat{\alpha}||^2 \leq ||y^{(m)} - \Theta_m \beta||^2\}\right) \leq$$
$$(1/N_m) \sum_{\alpha \in \mathcal{S}_m} \sum_{\hat{\alpha}, \hat{\alpha} \neq \alpha} Pr(||y^{(m)} - \Theta_m \hat{\alpha}||^2 \leq ||y^{(m)} - \Theta_m \alpha||^2)$$
$$= (1/N_m) \sum_{\alpha \in \mathcal{S}_m} \sum_{\hat{\alpha}, \hat{\alpha} \neq \alpha} Q(\sqrt{(||\Theta_m(\alpha - \hat{\alpha})||^2/2)})$$

where the Qfunction is the area under the Gaussian tail. This upper bound on $SER_m$ can be used to select the detection order: take $I_m$ to minimize the upper bound. Thus this measure is post-ML based on the SER upper bound.

A looser upper bound can be derived from the fact that for $\alpha, \dot{\alpha} \in \mathcal{S}_m$:

$$\|\Theta_m(\alpha-\dot{\alpha})\|^2 \geq \min_{1 \leq i \leq P_m}(\|[\Theta_m]_{:,i}\|^2 d^2_{min,i})$$

where $d^2_{min,i}$ is the minimum distance among symbols in the symbol constellation associated with the ith column of $\Theta_m$, $[\Theta_m]_{:,i}$. Thus, $$SER_m \leq (1/N_m) \sum_{\alpha \in \mathcal{S}_m} \sum_{\dot{\alpha} \neq \alpha} Q(\sqrt{(\|\Theta_m(\alpha-\dot{\alpha})\|^2/2)}) \leq$$

$$(N_m - 1) Q(\sqrt{(\min_{1 \leq i \leq P_m}(\|[\Theta_m]_{:,i}\|^2 d^2_{min,i}))})$$

When the same constellation (modulation scheme) is used for all of the transmit antennas, the minimum distance is common and the upper bound simplifies to:

$$SER_m \leq (N_m-1) Q(\sqrt{(d^2_{min} \min_{1 \leq i \leq P_m}(\|[\Theta_m]_{:,i}\|^2))})$$

This upper bound yields the following post-ML measure for selecting the detection order: at the mth iteration, select $I_m$ to maximize $\min_{1 \leq i \leq P_m}(\|[\Theta_m]_{:,i}\|^2)$. This measure is thus post-ML based on the channel norm after MMSE transformation.

7. Decision Alternatives

The foregoing preferred embodiments hard decision methods, $MLD_m$, convert $x_k^{(m)}$ into $\hat{s}_k^{(m)}$ use a maximum likelihood approach which applies a hard-limiter (hard-clipping) non-linearity. Alternative non-linearities, generically denoted as $\hat{s}^{(m)} = \mathcal{D}\{x^{(m)}\}$, such as hyperbolic tangent, may result in better performance. In this case the decision statistics that are close to zero are effectively scaled instead of clipped; the scaling depends upon the variance of the residual interference plus noise. For example, for a single BPSK symbol:

| | |
|---|---|
| Hyperbolic tangent: | $\mathcal{D}_{\tanh}(z) = \tanh(\text{Re}\{z\}/\xi)$ |
| Soft linear clipped: | $\mathcal{D}_{SL}(z) = +1 \quad \text{if Re}\{z\} > \xi$ |
| | $\qquad\qquad\; = -1 \quad \text{if Re}\{z\} < -\xi$ |
| | $\qquad\qquad\; = \text{Re}\{z\} \quad \text{if } |\text{Re}\{z\}| \leq \xi$ | where $\xi$ is a non-negative constant. For higher order modulation, the decision is done in the bit level following the bit log likelihood ratio computation (as described in Section 8). Alternatively, for QPSK, the real and imaginary parts of: $\mathcal{D}(z)$ can be taken as $\tan h(\text{Re}\{z\}/\xi)$ and $\tan h(\text{Im}\{z\}/\xi)$, respectively; or the corresponding soft linear with $\text{Re}\{z\}$ and $\text{Im}\{z\}$, respectively. Further, for higher order (larger constellations) the soft linear extends by selecting the constant to make $\mathcal{D}(z) = z$ for $z$ in the constellation. And for two or higher-dimensional constellations, extend by components. For example, with a subset of symbols of size $P_m = 2$, the ML decision on the soft estimate 2-vector $x^{(m)}$ gives the 2-vector of symbols in the product constellation closest to $x^{(m)}$; whereas, the soft linear would give the 2-vector $[\mathcal{D}_{SL}(x_1^{(m)}), \mathcal{D}_{SL}(x_2^{(m)})]$.

While any of those non-linear estimators can be used, the optimal soft estimator is the conditional expectation estimator (analogous to Section 2), which is $$\hat{s}^{(m)} = E[s^{(m)} | x^{(m)}] = \frac{\sum_c c \times \exp(-\|\Psi_m^{-1/2}(x^{(m)} - F_m H_m c)\|^2)}{\sum_c \exp(-\|\Psi_m^{-1/2}(x^{(m)} - F_m H_m c)\|^2)}$$

where the summation is over the set formed by the product of $P_m$ constellations of symbols with indices in $I_m$ (see discussion at the end of Section 3).

For systems with large constellation and/or a number of antennas, the computational burden may be prohibitive as it increases exponentially with the number of transmit antennas. In this case, sphere decoding type algorithm can be used to reduce computational complexity at the expense of some performance (while retaining most of the gain of maximum likelihood detector).

8. Decoding

The demodulator converts the soft symbol estimates $x^{(1)}$, $x^{(2)}, \ldots, x^{(M)}$ output by an M-iteration detector into conditional probabilities; and the conditional probabilities translate into bit-level log likelihood ratios (LLRs) for (sequence) decoding. In more detail, the LLRs in terms of the bits $u_{pk}$ which define the constellation symbols $s_p$ (e.g., two bits for a QPSK symbol, four bits for a 16QAM symbol, etc.) are defined (dropping the superscripts on the $x_p$) as $$LLR(u_{pk}) = \log\{P[u_{pk} = 1 | x_{pk}] / P[u_{pk} = 0 | x_{pk}]\}$$

$$= \log\{P[u_{pk} = 1 | x_{pk}]\} - \log\{P[u_{pk} = 0 | x_{pk}]\}$$

The LLRs can be computed using a channel model. For example, $$LLR(u_{pk}) = \log\{P[u_{pk} = 1 | x_p] / P[u_{pk} = 0 | x_p]\}$$

$$\log\{P(x_p | u_{pk} = 1) / p(x_p | u_{pk} = 0)\} +$$

$$\log\{P[u_{pk} = 1] / P[u_{nk} = 0]\}$$

where the first log term includes the probability distribution of the demodulated symbol $x_p$ which can be computed using the channel model. The second log term is the log of the ratio of a priori probabilities of the bit values and typically equals 0. So for an AWGN channel where the residual interference (interference which is not cancelled) is also a zero-mean, normally-distributed, independent random variable, the channel model gives:

$$p(x_p|s_p=c) \sim \exp(-|x_p-c|^2/\gamma_p)$$

where $c$ is a symbol in the symbol constellation and $\gamma_p$ is a normalization typically derived from the channel characteristics and the detector type. Indeed, the following section describes known normalizations and preferred embodiment normalizations. Of course, $\gamma_p$ is just twice the variance of the estimation error random variable.

Then compute LLRs by using an approximation which allows direct application of the channel model. Take $p(x_p|u_{pk}=1) = p(x_p|s_p=c_{pk=1})$ where $C_{pk=1}$ is the symbol in the sub-constellation of symbols with kth bit equal 1 and which is the closest to $x_p$; that is, $c_{pk=1}$ minimizes $|x_p-c_{k=1}|^2$ for $C_{k=1}$ a symbol in the sub-constellation with kth bit equal to 1. Analogously for $p(x_p|u_{pk}=0)$ using the sub-constellation of symbols with kth bit equal 0. Then with equal a priori probabilities of the bit values and the notation subscript k=1 and k=0 indicating symbols with kth bit 1 and 0, respectively, the approximation yields $$LLR(u_{pk}) = \log\{p(x_p|u_{pk}=1)/p(x_p|u_{pk}=0)\}$$
$$\cong 1/\gamma_p \cdot \{\min_{k=0}|x_p - c_{k=0}|^2 - \min_{k=1}|x_p - c_{k=1}|^2\}$$

Thus the LLR computation just searches over the two symbol sub-constellations for the minima.

Figure 4A:
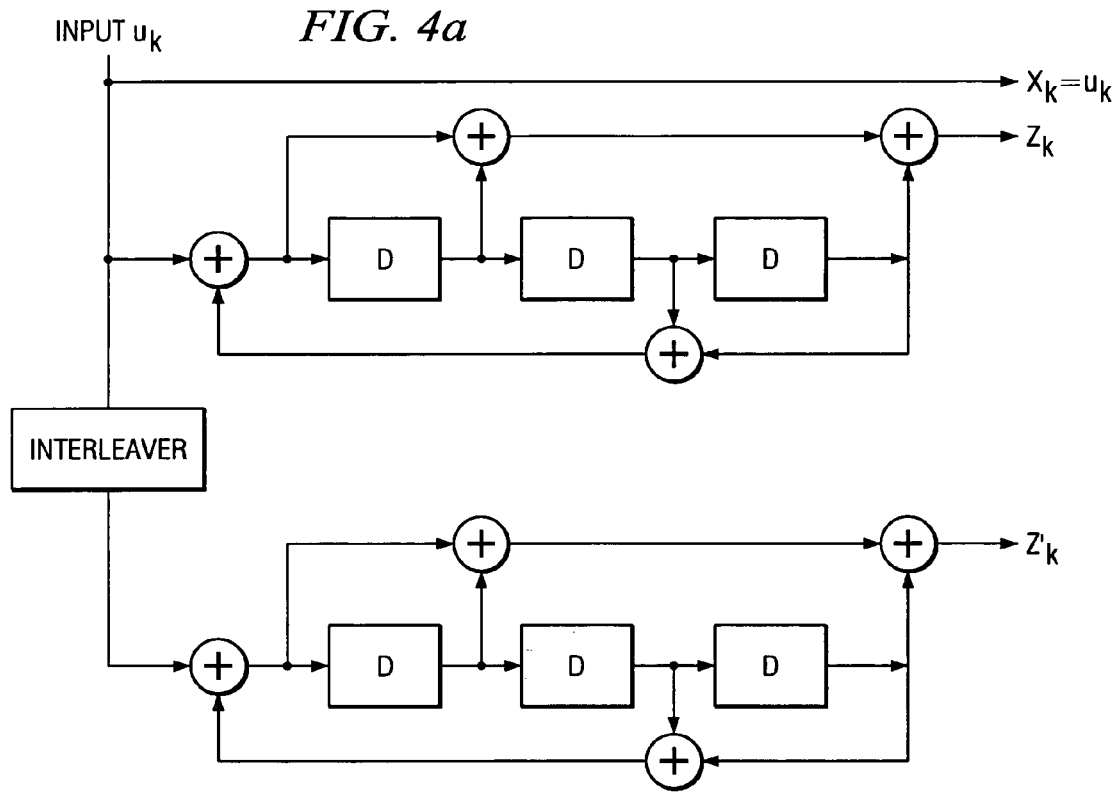
FIGS. 4a-4b show Turbo coding.
Figure 4B:
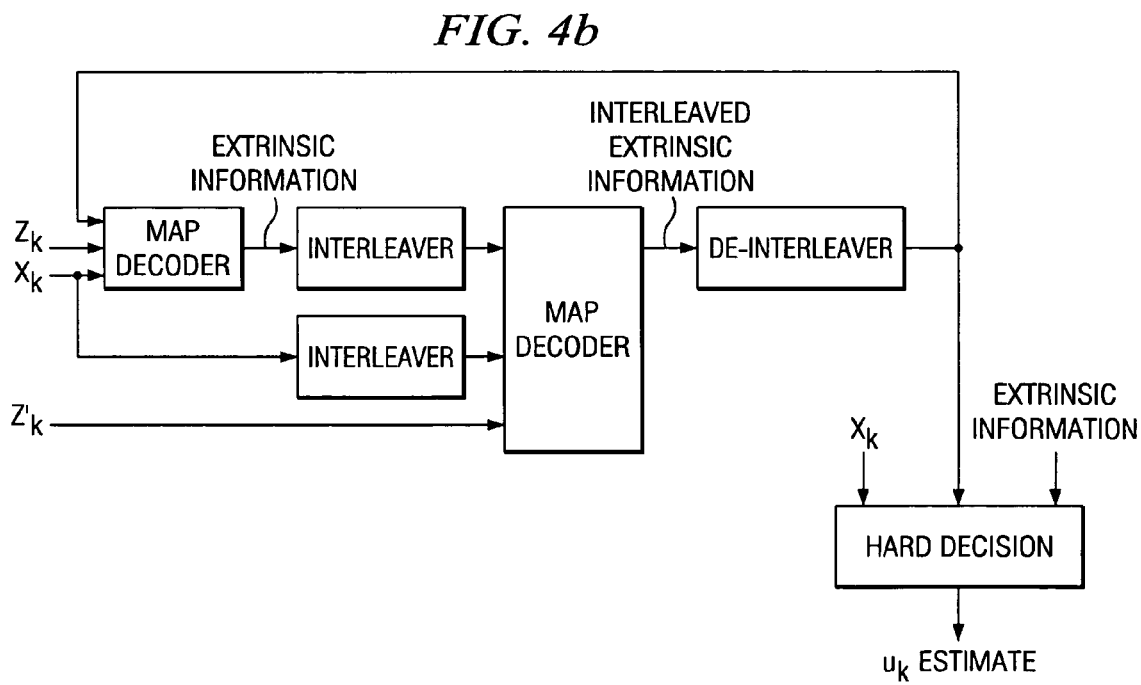

The LLRs are used in decoders for error correcting codes such as Turbo codes (e.g., iterative interleaved MAP decoders with BCJR or SOVA algorithm using LLRs for each MAP) and convolutional codes (e.g. Viterbi decoders). Such decoders require soft bit statistics (in terms of LLR) from the detector to achieve their maximum performance (hard bit statistics with Hamming instead of Euclidean metrics can also be used but result in approximately 3 dB loss). Alternatively, direct symbol decoding with LLRs as the conditional probability minus the a priori probability could be used. FIGS. 4a-4b illustrate the 3GPP Turbo encoder and an iterative decoder which includes two MAP blocks, an interleaver, a de-interleaver, and feedback for iterations.

9. Simulations

Simulations for 4×4 MIMO QPSK and 16QAM systems with P=Q=4 in spatially uncorrelated (IID) and correlated MIMO channels were performed to compare a preferred embodiment with other detection methods. The correlated spatial channel profile has the average and peak cross correlation of 0.16 and 0.40, respectively. FIGS. 3a-3d compare simulations with the following six detection methods including four preferred embodiment iterative reduced state ML variations:

(1) IMMSE UNORD: regular iterative MMSE without detection ordering.

(2) IMMSE ORD: regular iterative MMSE with detection ordering based on post-detection SINR.

(3) IRSML UNORD: MMSE-based iterative reduced state ML for M=2, $P_1=P_2=2$ and without ordering.

(4) IRSML ORD Pre-ML SINR: MMSE-based iterative reduced state ML for M=2, $P_1=P_2=2$ and with ordering based on SINR after MMSE transformation.

(5) IRSML ORD Post-ML Norm: MMSE-based iterative reduced state ML for M=2, $P_1=P_2=2$ and with ordering based on channel norm after MMSE transformation.

(6) IRSML ORD Post-ML SER: MMSE-based iterative reduced state ML for M=2, $P_1=P_2=2$ and with ordering based on SER bound after ML detection.

Figure 3A:
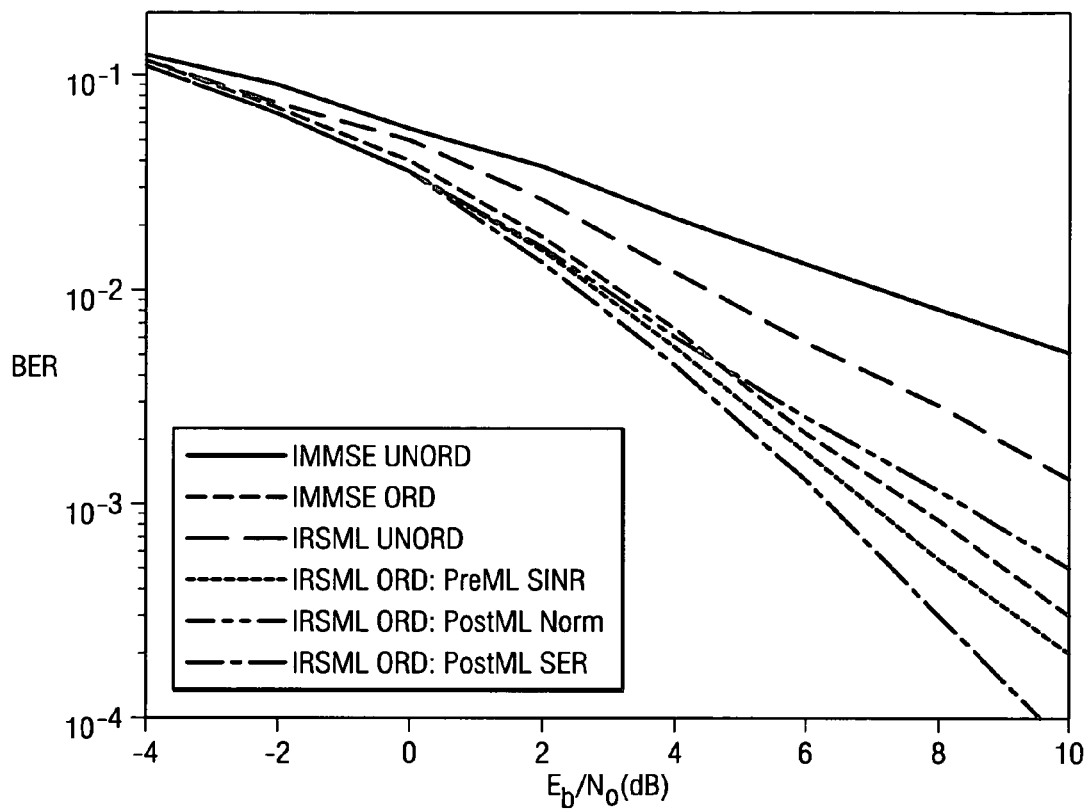
FIGS. 3a-3d are simulation results.
Figure 3B:
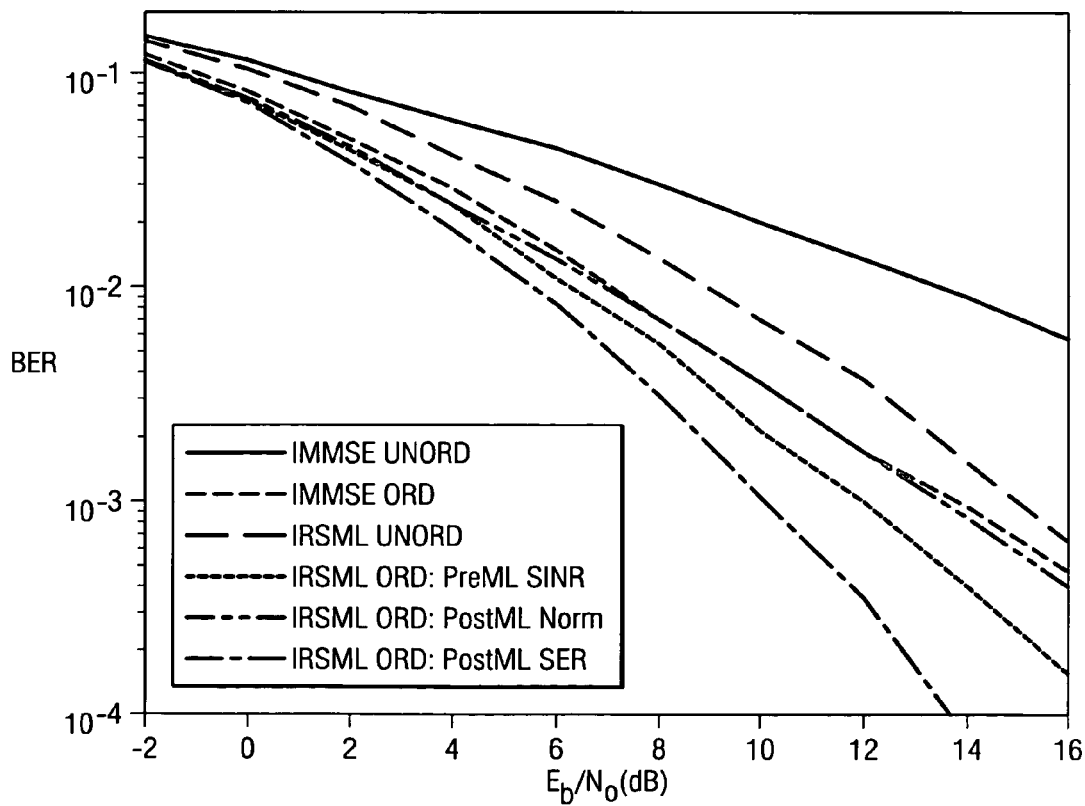
Figure 3C:
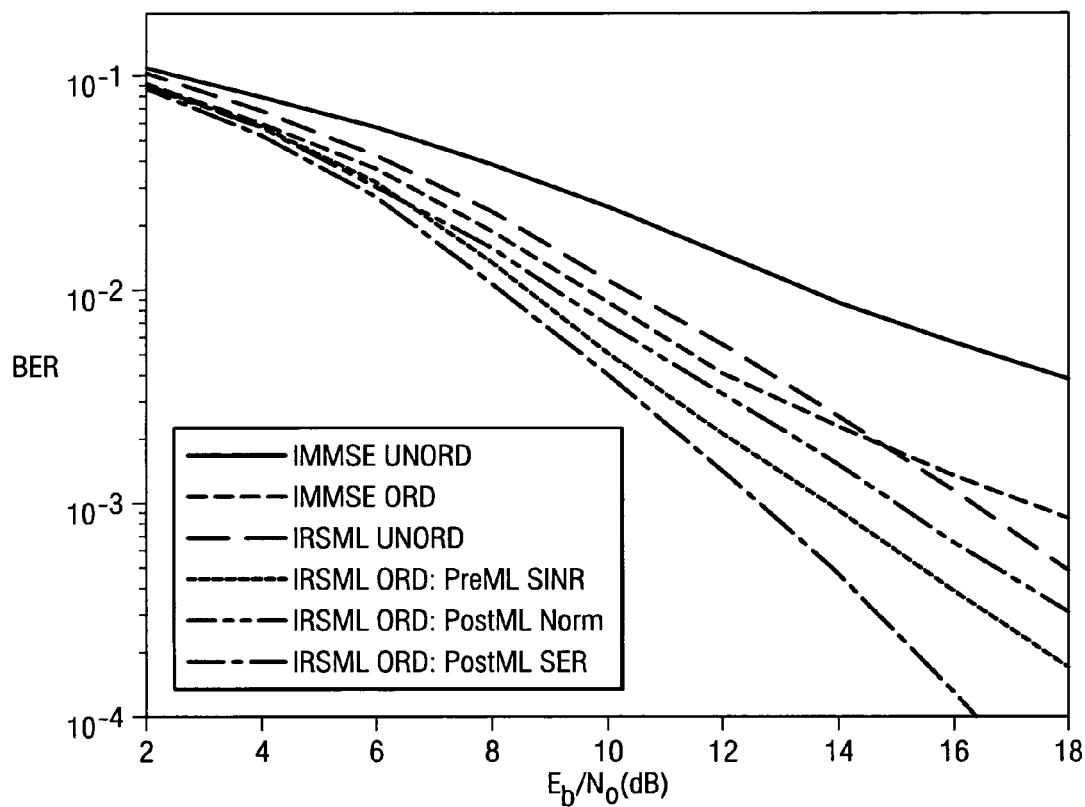
Figure 3D:
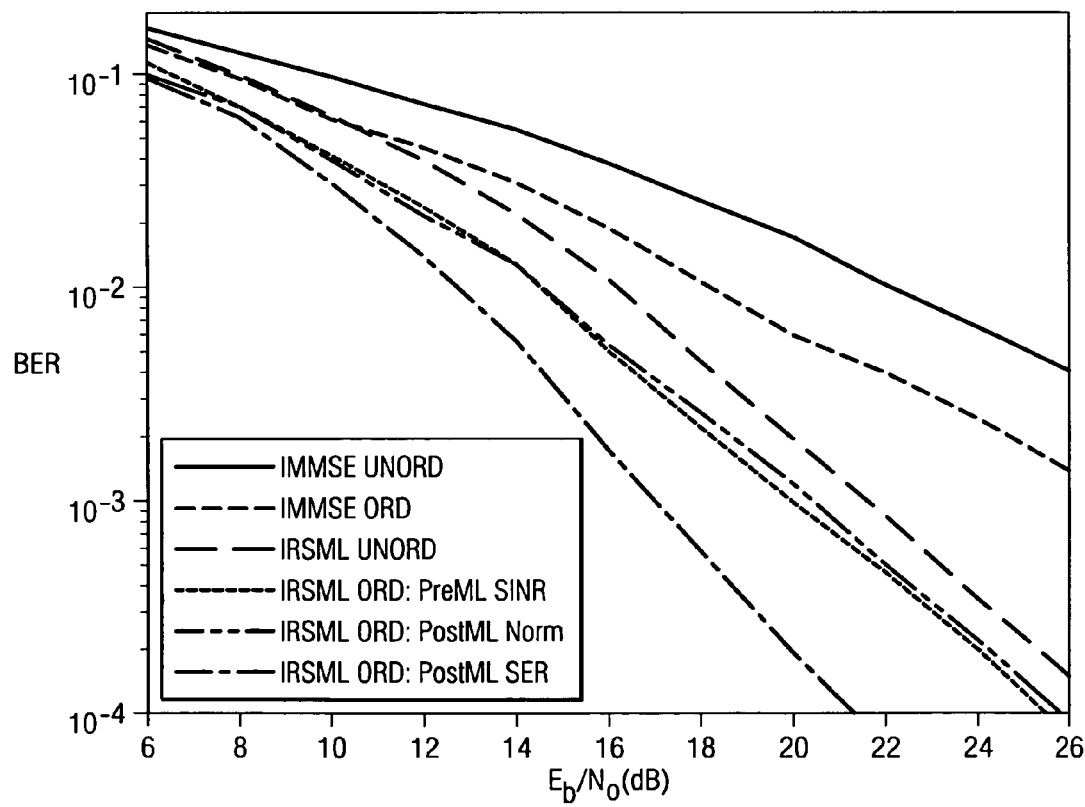

The raw bit error rate (BER) versus signal-to-noise ratio ($E_b/N_0$) results for QPSK in IID and correlated channels appear in FIGS. 3a-3b, respectively, and for 16QAM in IID and correlated channels appear in FIGS. 3c-3d, respectively. Observe that the gain of IRSML over regular IMMSE is more dramatic in spatially correlated channels and when no detection ordering is used. Notice also that IRSML with SER-based detection ordering results in a gain of 10-dB for 16QAM in correlated channels at BER=$10^{-3}$ compared to the regular IMMSE with detection ordering.

The computational complexity of preferred embodiment iterative reduced state ML methods can be compared to the full ML and the regular MMSE methods. In particular, consider two aspects: matrix inversion computation and hard decision estimation. For comparison, assume that the preferred embodiments use equal size subsets ($P_m$=P/M) and all methods use the same constellation (size C) for all symbols. Then the following table indicates the complexity of the methods.

| Detector | Matrix inversion | Hard decision |
| --- | --- | --- |
| Regular iterative | $\sim PxP^3$ | $\sim PxC$ |
| Maximum likelihood | none | $\sim C^P$ |
| IRSML | $\sim MxP^3$ | $\sim MxC^{P/M}$ |

Thus for the preferred embodiments with two subsets (M=P/2 and $P_m$=2), the computational complexity of the preferred embodiments is comparable to the regular iterative detector for small to moderate constellation size. For large constellation size (such as 64-QAM or 256-QAM), the complexity increase for the preferred embodiments over the regular iterative detector becomes significant. However, its performance gain is expected to become more dramatic as indicated by the simulations.

What is claimed is:

1. A method of detection in a multiple-input, multiple-output wireless communication system, comprising the steps of:

(a) receiving a signal representing a set of P symbols, one symbol transmitted from each of P antennas where P is a positive integer greater than 2;

(b) jointly estimating a subset of $P_1$ symbols of said set of P symbols where $P_1$ is a positive integer;

(c) after step (b), jointly estimating a subset of $P_2$ symbols of said set of P symbols where $P_2$ is a positive integer and wherein said subset of $P_1$ symbols and said subset of $P_2$ symbols are members of a partition of said set of P symbols and $P_1+P_2$ is greater than 2 and wherein $P_1=P_2$=P/2 when there are 2 antennas.

2. The method of claim 1, further comprising:

(a) after step (c) of claim 1, for each m in the set $\{3, \ldots, M\}$, jointly estimating a subset of $P_m$ symbols of said set of P symbols where $P_m$ is a positive integer and wherein said subset of $P_m$ symbols is a member of a partition of said set of P symbols and $P_1+P_2+ \ldots +P_M$=P where M is a positive integer.

3. The method of claim 2, wherein:

(a) $P_1=P_2= \ldots =P_M$=P/M.

4. The method of claim 1, wherein:

(a) said jointly estimating of step (b) of claim 1 includes a decision using $P_1$-vector of soft estimates $F_1$ r where r is a Q-vector of said received signals of step (a) of claim 1 and $F_1$ is a $P_1 \times Q$ matrix for zero-forcing estimation;

(b) said jointly estimating of step (C) of claim 1 includes a decision using $P_2$-vector of soft estimates $F_2(r-G_1 s^{(1)})$ where $F_2$ is a $P_2 \times Q$ matrix for zero-forcing estimation, $G_1$ is a $Q \times P_1$ matrix for zero-forcing feedback cancellation, and $s^{(1)}$ is the $P_1$-vector estimation result of step (b) of claim 1.

5. The method of claim 1, wherein:

(a) said jointly estimating of step (b) of claim 1 includes a decision using $P_1$-vector of soft estimates $F_1$ r where r is a Q-vector of said received signals of step (a) of claim 1 and $F_1$ is a $P_1 \times Q$ matrix for minimum mean square error estimation (b) said jointly estimating of step (c) of claim 1 includes a decision using $P_2$-vector of soft estimates $F_2(r - G_1 s^{(1)})$ where $F_2$ is a $P_2 \times Q$ matrix for minimum mean square error estimation, $G_1$ is a $Q \times P_1$ matrix for zero-forcing feedback cancellation, and $s^{(1)}$ is the $P_1$-vector estimation result of step (b) of claim 1.

6. The method of claim 1, wherein:

(a) said jointly estimating of step (b) of claim 1 includes a decision using $P_1$-vector of soft estimates $F_1 r$ where r is a Q-vector of said received signals of step (a) of claim 1 and $F_1$ is a $P_1 \times Q$ matrix for minimum mean square error estimation (b) said jointly estimating of step (c) of claim 1 includes a decision using $P_2$-vector of soft estimates $F_2(r - G_1 s^{(1)})$ where $F_2$ is a $P_2 \times Q$ matrix for minimum mean square error estimation including feedback error compensation, $G_1$ is a $Q \times P_1$ matrix for zero-forcing feedback cancellation including feedback error compensation, and $s^{(1)}$ is the $P_1$-vector estimation result of step (b) of claim 1.

7. The method of claim 1, wherein:

(a) said subset of $P_1$ symbols of step (b) of claim 1 is determined according to signal-to-interference-plus-noise ratios of said P symbols prior to a decision in said estimating.

8. The method of claim 1, wherein:

(a) said subset of $P_1$ symbols of step (b) of claim 1 is determined according to projected signal-to-interference-plus-noise ratios of said P symbols after a decision in said estimating.

9. The method of claim 1, wherein:

(a) said jointly estimating of step (b) of claim 1 includes a maximum likelihood decision; and (b) said jointly estimating of step (c) of claim 1 includes a maximum likelihood decision.

10. The method of claim 1, wherein:

(a) said jointly estimating of step (b) of claim 1 includes a soft decision; and (b) said jointly estimating of step (c) of claim 1 includes a soft decision.

11. The method of claim 1, further comprising:

(a) jointly re-estimating said subset of $P_1$ symbols using error compensation determined by said jointly estimating said subset of $P_2$ symbols of step (c) of claim 1.

* * * * *